May 6, 1941.  K. K. PROBST  2,240,573

VALVE AND STOP FOR WOBBLER MOTORS

Filed Jan. 20, 1939

INVENTOR.
Karl K. Probst
BY
ATTORNEY.

Patented May 6, 1941

2,240,573

UNITED STATES PATENT OFFICE 2,240,573

VALVE AND STOP FOR WOBBLER MOTORS

Karl K. Probst, Detroit, Mich., assignor to William L. Hoburg, Sharpsburg, Pa., as trustee for the Meter Motor Products Co.

Application January 20, 1939, Serial No. 251,940

13 Claims. (Cl. 121—69)

This invention relates to windshield wiper motors of the type embodying a wobble plate actuated by fluid pressure and has for its primary object to provide a control for such motors for causing them to stop at the same point in their cycle each time they are rendered inoperative.

In the operation of windshield wipers of automotive vehicles, it is desirable that the wiper or wipers should be moved to a position where the line of vision through the windshield is unobstructed when rendered inoperative. It is an object of this invention to provide a motor operable by suction from the motor of the vehicle or by air under pressure which when rendered inoperative by a manual control moves the wiper or wipers to a parked position.

Another object is to provide a fluid actuated continuously rotating type of motor embodying a single means for controlling the actuating fluid and for stopping the motor always at the same point in its cycle of operation, said means including both a valve and a positive stop arranged for unitary operation with the stop functioning slightly in advance of the valve. In other words, the valve controls the actuating fluid, the stop controls movement of the fluid impelled member in the motor, and the two are so correlated that upon actuation of the single control the valve remains at least partially open in order that fluid pressure remains present to continue to impel the impelled member until the stop functions to define the point in the motor cycle at which said impelled member should come to rest.

The type of motor with which the present invention is more particularly concerned comprises a plate or disc mounted centrally upon a sphere which is seated at the convergence of two opposed conical end walls of an enclosing chamber having a spherical side wall. A radial partition extends from the supporting sphere to the spherical wall and inlet and exhaust ports are provided on opposite sides of the partition. When fluid under pressure is circulated through the chamber, from the intake around the partition to the exhaust, it causes the plate to gyrate or rock circularly, with a tilting or wobbling motion. The motion of the plate may be utilized directly or through drive gearing to operate a final shaft having an arm adapted to be operatively connected to a windshield wiper, or a plurality of wipers. The invention provides for the control of the flow of fluid through the chamber by means of a valve adapted to control one of the ports, preferably the exhaust port, and also provides for stopping the motor at a definite point in its cycle by means of coacting members carried by the valve and gearing for positively preventing rotation of the gearing. In order that the actuating fluid cannot be cut off to render the motor inoperative in any position other than the predetermined position the valve and stop are correlated in such manner that fluid pressure cannot be entirely cut off until the stop functions.

Other objects and advantages will become more fully apparent as reference is had to the accompanying drawing wherein my invention is illustrated and in which.

Figure 1:
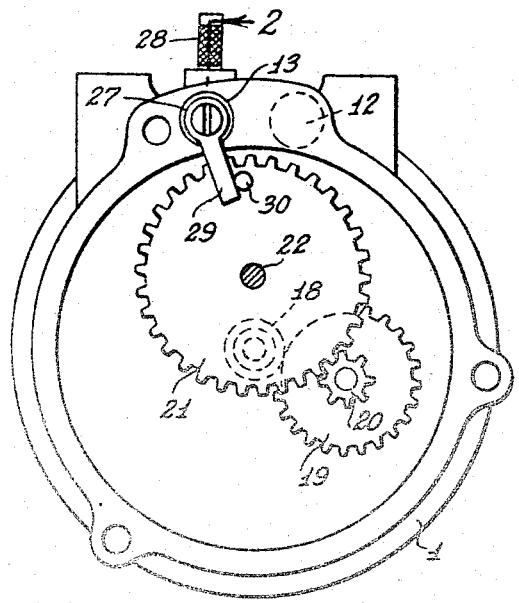
Fig. 1 is an end elevation with the gear housing removed.
Figure 3:
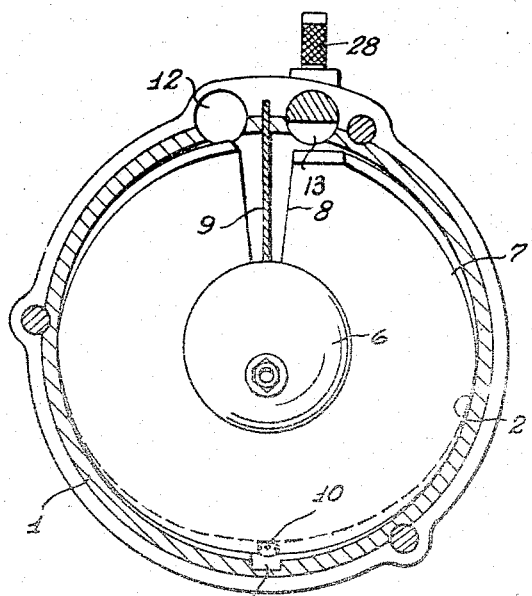
Fig. 3 is a section taken on the line 3—3 of Fig. 2.
Figure 5:
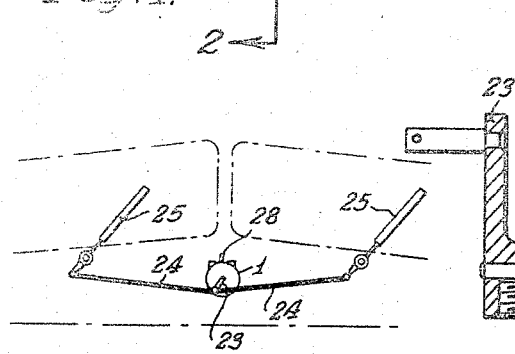
Fig. 5 is a view illustrating the connection of the motor to a pair of windshield wipers.

The motor housing 1 is formed in two sections to facilitate assembly and has a chamber therein defined by a spherical side wall 2 and by inwardly converging conical end walls 3 and 4. The conical end walls 3 and 4 are truncated and have spherical bearings 5 at the truncated ends thereof rotatably supporting a sphere 6. A plate 7 is mounted on the sphere 6 in diametric relation therewith and is provided with a substantially radial recess 8 accommodating a radial partition 9 which extends from the spherical wall 2 to the sphere 6. Diametrically opposite the partition 9 a pin 10 is loosely mounted in the plate 7 and this pin operates in a slot 11 in the housing 1 to prevent rotation of the plate, while permitting gyratory movement thereof.

A fluid inlet port 12 is provided on one side of the partition 9 and a fluid outlet port 13 is provided on the other side. When fluid under pressure is circulated around the partition, from the inlet 12 to the outlet 13, it imparts a gyratory, tilting motion to the plate 7. To prevent leakage of the fluid between the sides of the plate 7 and the adjacent conical walls 3 and 4 sealing pads 14 of resilient material, such as rubber, are placed between the disc and end walls. The pads 14 are preferably surface bonded to the end walls.

As the plate 7 gyrates the outer end of a stem 15 secured to the sphere 6 is moved through a circular orbit, and thereby imparts rotation to a disc 16 which it engages. The disc 16 is mounted upon a rotatable shaft 17 having a gear 18 thereon operatively connected by a train composed of gears 19, 20 and 21 to a final shaft 22. An arm 23 on the shaft 22 is connected by swing links 24 to windshield wipers 25 and imparts oscillatory movement to the wipers as it is rotated with the shaft 22.

In the outlet port 13 is provided a valve seat 26 adapted to be engaged by the tapered end of a sliding valve 27 having a stem 28 extending externally of the housing 1 to permit manual reciprocation thereof. The valve 27 has a rigid finger 29 mounted thereon which is adapted to project into the path of movement of a pin 30 mounted on the gear 21.

Figure 2:
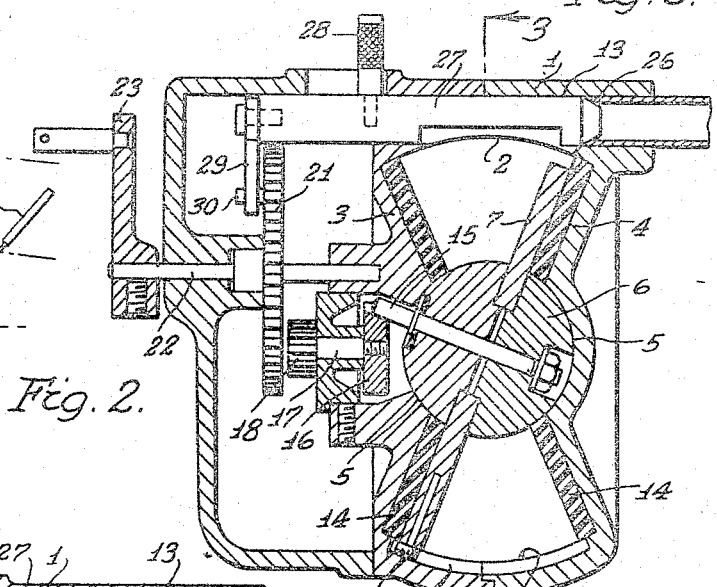
Fig. 2 is a section taken on the line 2—2 of Fig. 1.
Figure 4:
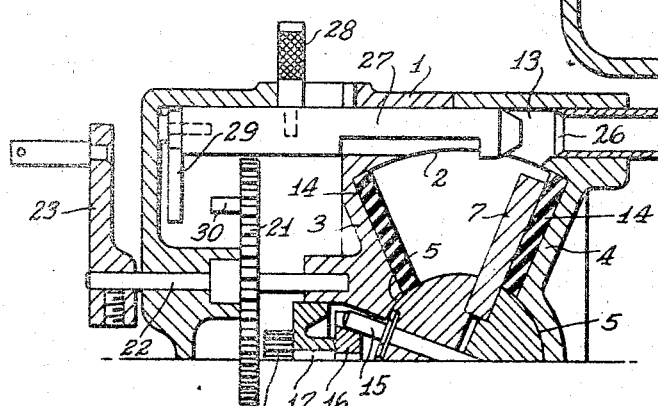
Fig. 4 is a fragmental section similar to Fig. 2, illustrating the valve and stop in an inoperative position.

As shown in Fig. 4 the valve 27 is spaced from the seat 26 and the finger 29 is out of the path of movement of the pin 30, thus permitting the flow of fluid through the chamber and free rotation of the gearing. To render the motor inoperative, the valve is manually shifted to the position shown in Fig. 2, where it seats on the seat 26 and closes the port 13. It will be noted, however, that in order to seat the valve 27 the finger 29 must be moved into the path of movement of the pin 30, and that the valve must move a substantial distance after the finger has entered said path of movement. With this correlation the motor always continues to operate until the pin 30 contacts the finger 29 so that the motor comes to rest always at the same point in its cycle. By adjusting the arm 23 with respect to the shaft 22 and the windshield wipers 25, the wipers may be brought to rest at any desired stage in their cycle.

Although specific embodiments of the invention have been illustrated and described, it will be undertsood that changes may be made within the scope of the appended claims without departing from the spirit of the invention, and such changes are contemplated.

What is claimed is:

1. In combination, a motor comprising a housing, a fluid impelled member in said housing, means for circulating fluid under pressure through said housing to impel movement of said member, and a unitary manually operable means including a valve for preventing the flow of fluid and a positive stop for stopping movement of said member at a point in its cycle which may be predetermined.

2. In combination, a motor comprising a housing, a fluid impelled member in said housing, means for circulating fluid under pressure through said housing to impel movement of said member, and a unitary manually operable means including a valve for preventing the flow of fluid and a positive stop for stopping movement of said member at a point in its cycle which may be predetermined, said valve and stop being correlated in such manner that the stop functions in advance of the valve.

3. In combination, a motor comprising a housing, a fluid impelled member in said housing, means for circulating fluid under pressure through said housing to impel movement of said member, gearing actuated by said member, and a unitary means including a valve for preventing the flow of fluid and a positive stop for stopping rotation of said gearing at a predetermined point in its cycle of operation.

4. In combination, a motor comprising a housing, a fluid impelled member in said housing, means for circulating fluid under pressure through said housing to impel movement of said member, gearing actuated by said member, and a unitary means including a valve for preventing the flow of fluid and a positive stop for stopping rotation of said gearing at a predetermined point in its cycle of operation, said valve and stop being correlated in such manner that the stop functions in advance of the valve.

5. In combination, a motor comprising a housing, a fluid impelled member in said housing, means including an inlet and an outlet for circulating fluid under pressure through said housing, and a unitary manually operable means including a valve for closing said outlet and a positive stop for stopping said member at a predetermined point in its cycle.

6. In combination, a motor comprising a housing, a fluid impelled member in said housing, means for circulating fluid under pressure through said housing to impel movement of said member, gearing actuated by said member, and a unitary means including a valve for preventing the flow of fluid and a positive stop for stopping rotation of said gearing at a predetermined point in its cycle of operation, said valve and stop being correlated in such manner that the stop functions in advance of the valve.

7. In combination, a motor comprising a housing, a fluid impelled member in said housing, means including inlet and outlet ports for circulating fluid under pressure through said housing a valve adapted to close one of said ports, positive means adapted to stop said motor at a predetermined point in its cycle, and a single actuator for actuating the valve and positive means.

8. In combination, a motor comprising a housing, a fluid impelled member in said housing, means including inlet and outlet ports for circulating fluid under pressure through said housing, a valve adapted to close one of said ports, gearing actuated by said member, a positive stop for stopping said gearing at a predetermined point in its cycle of operation, and a single means for actuating the valve and stop.

9. In combination, a motor comprising a housing, a fluid impelled member in said housing, means including inlet and outlet ports for circulating fluid under pressure through said housing, a valve adapted to close one of said ports, gearing actuated by said member, a positive stop for stopping said gearing at a predetermined point in its cycle of operation, and a single means for actuating the valve and stop said valve and stop being correlated in such manner that the stop functions in advance of the valve.

10. In combination, a motor comprising a housing, a fluid impelled member in said housing, means including inlet and outlet ports for circulating fluid under pressure through said housing, a valve adapted to close one of said ports, gearing and means carried by said valve for engaging said stop when said valve is moved toward its closed position.

11. In combination, a motor comprising a housing, a fluid impelled member in said housing, means including inlet and outlet ports for circulating fluid under pressure through said housing, an element rotated by said member, and means having a valve for closing one of said ports and a stop for engaging said rotated element for stopping rotation of the latter.

12. In combination a motor having inwardly converging conical end walls, a spherical side wall, a radial partition, inlet and outlet ports on opposite sides of the partition, and a wobble plate mounted at the convergence of said conical walls, a valve adapted to close one of said ports, and stop means actuated by said valve for stopping said plate at a predetermined point in its cycle of operation.

13. In combination a motor having inwardly converging conical end walls, a spherical side wall, a radial partition, inlet and outlet ports on opposite sides of the partition, and a wobble plate mounted at the convergence of said conical walls, gearing actuated by said wobble plate, a valve adapted to close one of said ports, and stop means for stopping movement of said gearing at a predetermined point in the cycle of operation thereof.

KARL K. PROBST.